United States Patent
Aoki (10) Patent No.: US 12,360,365 B2
(45) Date of Patent: Jul. 15, 2025

(54) DISPLAY DEVICE

(71) Applicant: Japan Display Inc., Tokyo (JP)

(72) Inventor: Shigenori Aoki, Tokyo (JP)

(73) Assignee: Japan Display Inc., Tokyo (JP)

(*) Notice: Subject to any disclaimer, the term of this patent is extended or adjusted under 35 U.S.C. 154(b) by 560 days.

(21) Appl. No.: 17/739,722

(22) Filed: May 9, 2022

(65) Prior Publication Data

US 2022/0260834 A1    Aug. 18, 2022

Related U.S. Application Data

(63) Continuation of application No. PCT/JP2020/042067, filed on Nov. 11, 2020.

(30) Foreign Application Priority Data

Nov. 12, 2019 (JP) .................... 2019-204883

(51) Int. Cl.
  G02B 27/01   (2006.01)
  G02B 26/02   (2006.01)
  G02F 1/19    (2019.01)

(52) U.S. Cl.
  CPC ......... *G02B 27/0101* (2013.01); *G02B 26/02* (2013.01); *G02F 1/19* (2013.01); *G02B 2027/011* (2013.01); *G02B 2027/0136* (2013.01)

(58) Field of Classification Search
  CPC ........ G02B 27/0101; G02B 2027/0123; G02B 2027/0154; G02B 2027/0159; G02B 2027/0136
  See application file for complete search history.

(56) References Cited

U.S. PATENT DOCUMENTS

| | | |
|---|---|---|
| 2017/0261746 A1 | 9/2017 | Tam et al. |
| 2018/0017792 A1 | 1/2018 | Takazawa et al. |
| 2018/0124364 A1* | 5/2018 | Yata ............... H04N 9/3182 |
| 2019/0086661 A1 | 3/2019 | Misawa et al. |
| 2020/0018953 A1 | 1/2020 | Ito et al. |

FOREIGN PATENT DOCUMENTS

| | | |
|---|---|---|
| JP | UH033726 U1 | 3/1991 |
| JP | 2007-065011 A | 3/2007 |
| JP | UP2016-133773 A | 7/2016 |
| WO | WO2017061019 A1 | 4/2017 |
| WO | WO2018168708 A1 | 9/2018 |

OTHER PUBLICATIONS

International Search Report issued in International Patent Application No. PCT/JP2020/042067 on Jan. 26, 2021 and English translation of same. 5 pages.
Written Opinion issued in International Patent Application No. PCT/JP2020/042067 on Jan. 26, 2021. 5 pages.

* cited by examiner

*Primary Examiner* — Ryan D Howard
(74) *Attorney, Agent, or Firm* — K&L Gates LLP (57) ABSTRACT

According to an aspect, a display device includes: a display panel; a first optical component serving as a switchable optical component capable of being switched between a reflection state and a transmission state of light by a reflection surface thereof; and a second optical component. The reflection surface of the first optical component that faces the display panel is arranged on a light path extending from the display panel. The second optical component has a reflection surface. The reflection surface of the second optical component is on a path of light reflected by the first optical component.

20 Claims, 9 Drawing Sheets

DISPLAY DEVICE

CROSS-REFERENCE TO RELATED APPLICATION

This application claims the benefit of priority from Japanese Patent Application No. 2019-204883 filed on Nov. 12, 2019 and International Patent Application No. PCT/JP2020/042067 filed on Nov. 11, 2020, the entire contents of which are incorporated herein by reference.

BACKGROUND

1. Technical Field

What is disclosed herein relates to a display device.

2. Description of the Related Art

A head-up display (HUD) that projects an image onto a projection target such as a front window and a combiner of a vehicle has been known (for example, Japanese Patent Application Laid-open Publication No. 2007-65011).

A conventional HUD projects one image to a predetermined site. Therefore, when a plurality of images are desired to be projected, a plurality of HUDs need to be provided.

For the foregoing reasons, there is a need for a display device capable of projecting a plurality of images.

SUMMARY

According to an aspect, a display device includes: a display panel; a first optical component serving as a switchable optical component capable of being switched between a reflection state and a transmission state of light by a reflection surface thereof; and a second optical component. The reflection surface of the first optical component that faces the display panel is arranged on a light path extending from the display panel. The second optical component has a reflection surface. The reflection surface of the second optical component is on a path of light reflected by the first optical component.

DETAILED DESCRIPTION

Hereinafter, embodiments of the present disclosure will be described with reference to the drawings. What is disclosed herein is merely an example, and it is needless to say that appropriate modifications within the gist of the disclosure at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has been already referred, and detail explanation thereof can be appropriately omitted.

Figure 1:
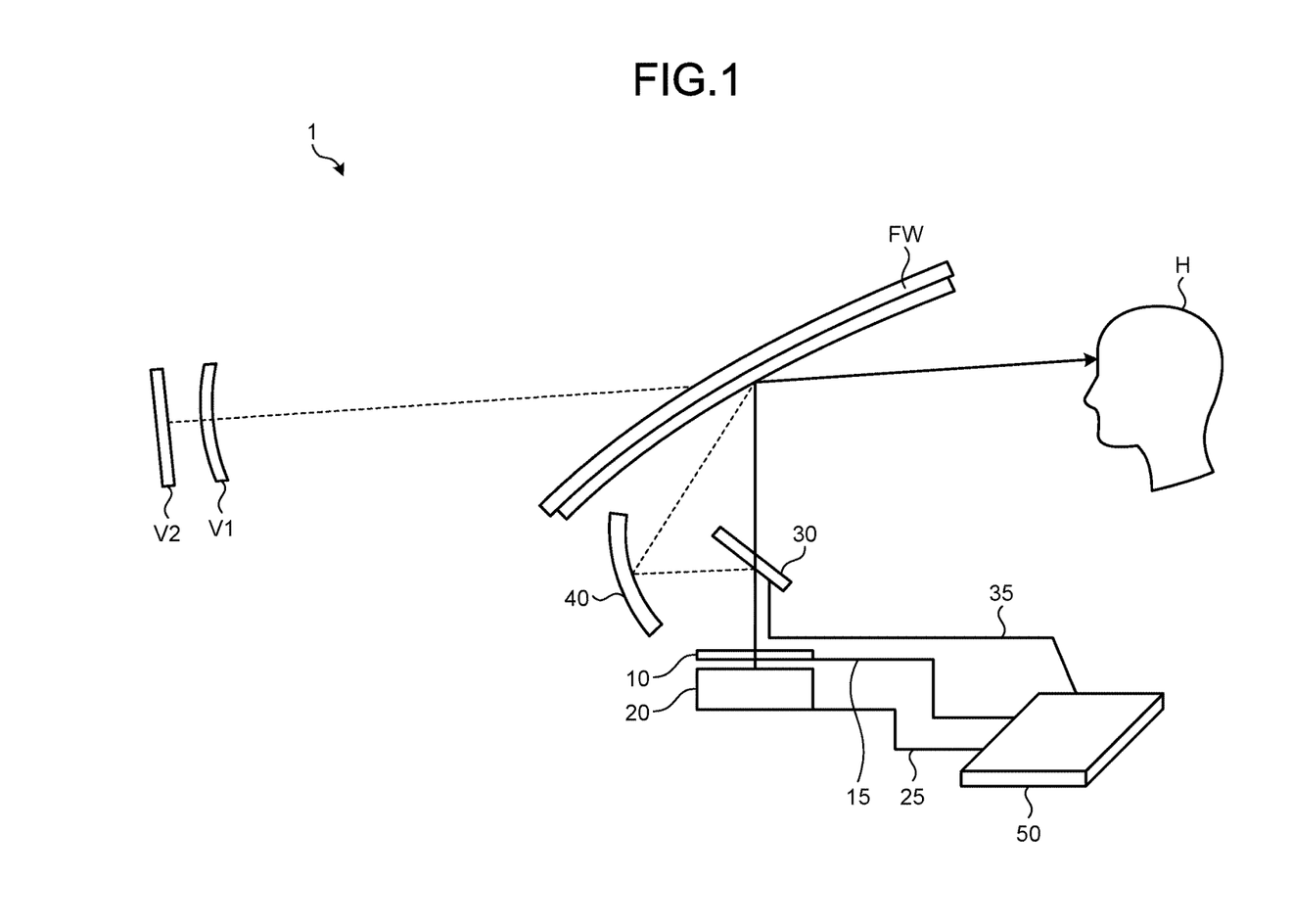
FIG. 1 is a schematic diagram illustrating a main configuration and a principle of a display device.

FIG. 1 is a schematic diagram illustrating a main configuration and a principle of a display device 1. The display device 1 projects an image onto a projection portion such as a front window FW of a vehicle. A user H views the projected image as a virtual image V.

Figure 2:
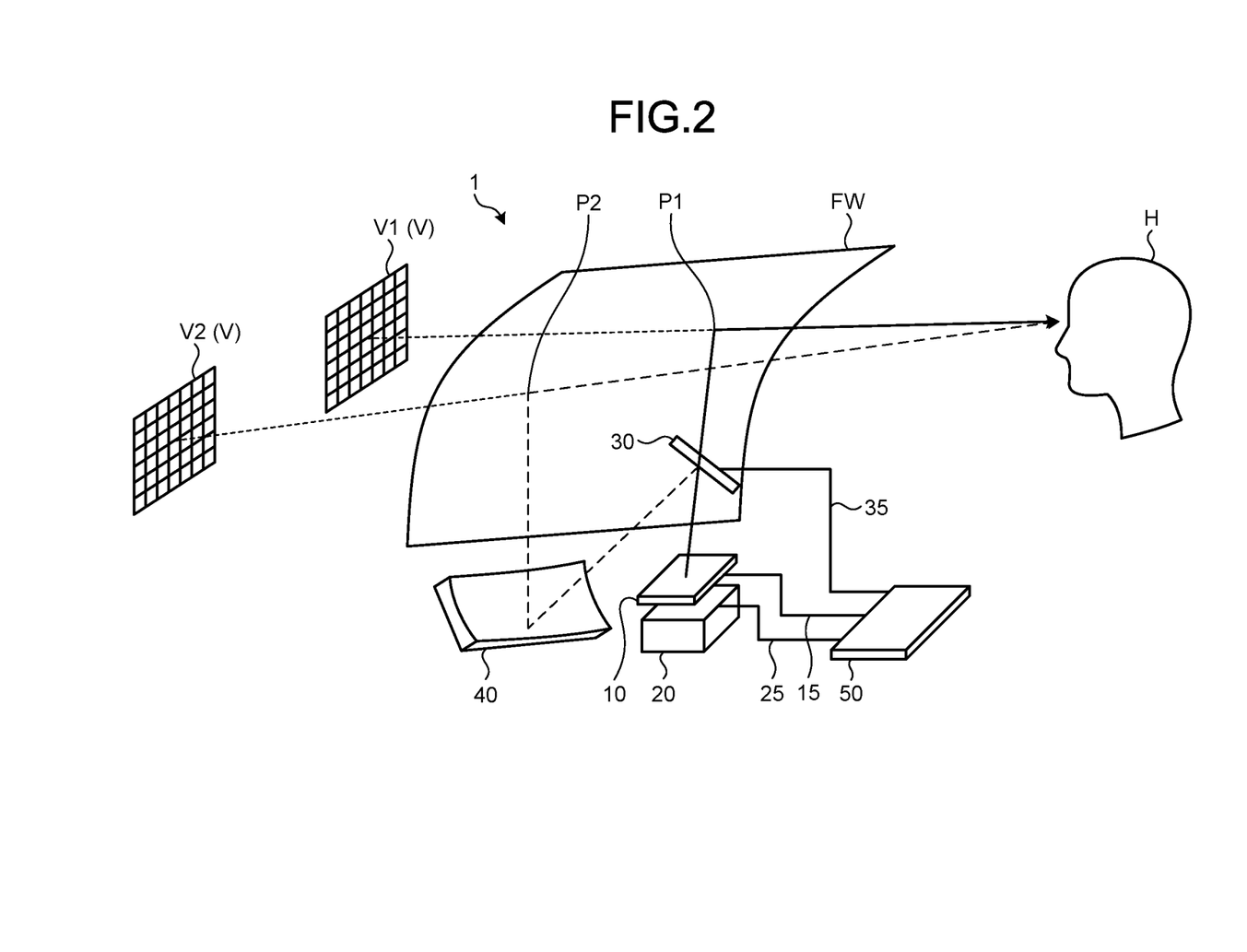
FIG. 2 is a schematic diagram illustrating difference between a first position and a second position where the display device projects respective images and difference between positions of virtual images.

FIG. 2 is a schematic diagram illustrating difference between a first position P1 and a second position P2 where the display device 1 projects respective images and difference between positions of virtual images V (a virtual image V1 and a virtual image V2). The display device 1 includes a display panel 10, a light source 20, a first optical component 30, a second optical component 40, and a controller (control circuit) 50. The display panel 10 and the controller 50 are coupled via wiring 15. The light source 20 and the controller 50 are coupled via wiring 25. The first optical component 30 and the controller 50 are coupled via wiring 35.

Figure 12:
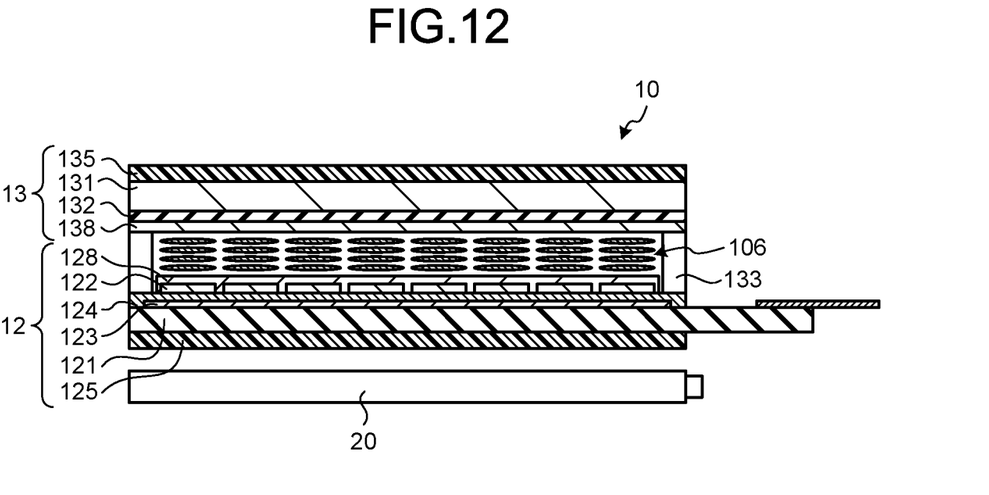
FIG. 12 is a view illustrating an example of the specific configuration of a display panel.

The display panel 10 is, for example, a transmissive liquid crystal display panel (refer to FIG. 12). The light source 20 includes a light source element such as a light-emitting diode (LED) and is provided on the rear side of the display panel 10 to emit light to the display panel 10. The rear side of the display panel 10 is the opposite side to the front window FW with respect to a position of the display panel 10. Light from the light source 20 is projected onto the front window FW through the display panel 10. The user H views the projected light as the virtual image V. An image projected directly from the display panel 10 to the first position P1 is not corrected by a concave mirror and may therefore be distorted. When the distortion needs to be corrected, the image for the first position P1 may be projected onto a flat combiner or be once reflected and corrected by a concave mirror. The flat combiner is made of transparent resin with a reflectance high enough to sufficiently reflect light of the image from the display panel 10.

The first optical component 30 is a switchable optical component that can be switched between a reflection state and a transmission state of light by a reflection surface thereof. When the first optical component 30 is in the transmission state, light output from the display panel 10 is projected to the first position P1 of the front window FW without a light path thereof being changed by the first optical component 30. The user H can view the virtual image V1 corresponding to light projected to the first position P1.

A reflection surface of the first optical component 30 that reflects light in the reflection state, faces the display panel 10. The reflection surface of the first optical component 30 is arranged on the light path extending from the display panel 10. The second optical component 40 is a reflection mirror. When correcting distortion of a projected image that is caused by a curved surface of the front window FW, a reflection mirror with a curved surface, such as a concave mirror, is used for the second optical component 40. A reflection surface of the second optical component 40 is on a path of light reflected by the first optical component 30. The reflection surface of the second optical component 40 and the reflection surface of the first optical component 30 that is in the reflection state face inwardly when an inward side denotes a side on which the light path of light reflected by the first optical component 30 extends. That is to say, when light from the display panel 10 is reflected by the reflection surface of the first optical component 30 in the reflection state, the reflected light is further reflected by the second optical component 40. The light reflected by the second optical component 40 in the above-mentioned manner is projected to the second position P2 of the front window FW. When the first optical component 30 is in the reflection state, light output from the display panel 10 is therefore projected to the second position P2 of the projection portion. The second position P2 is different from the first position P1. The user H can view the virtual image V2 corresponding to light projected to the second position P2.

Figure 9A:
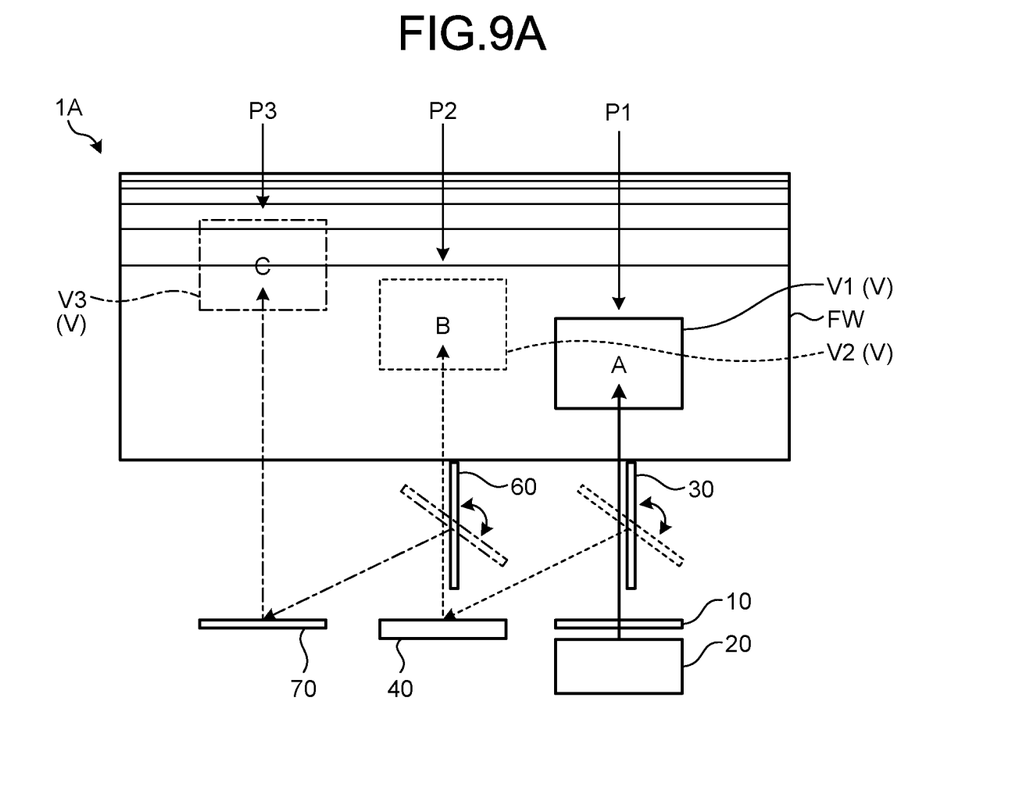
FIG. 9A is a schematic view illustrating difference between an image projected to a first position, an image projected to a second position, and an image projected to a third position.

As schematically illustrated in FIG. 1, the heights of projection positions of light for enabling the respective virtual images V including the virtual images V1 and V2 to be viewed may be the same. Alternatively, as schematically illustrated in FIG. 2 and FIG. 9A described later, the heights of the projection positions may be different from one another. The first position P1 and the second position P2 only need to be determined such that the virtual image V1 and the virtual image V2 are viewed to be at different positions.

The switchable optical component is, for example, a rotating mirror. Examples of the specific configuration of the rotating mirror (rotating mirrors 30A and 30B) will be explained below with reference to FIGS. 3 to 5.

Figure 3:
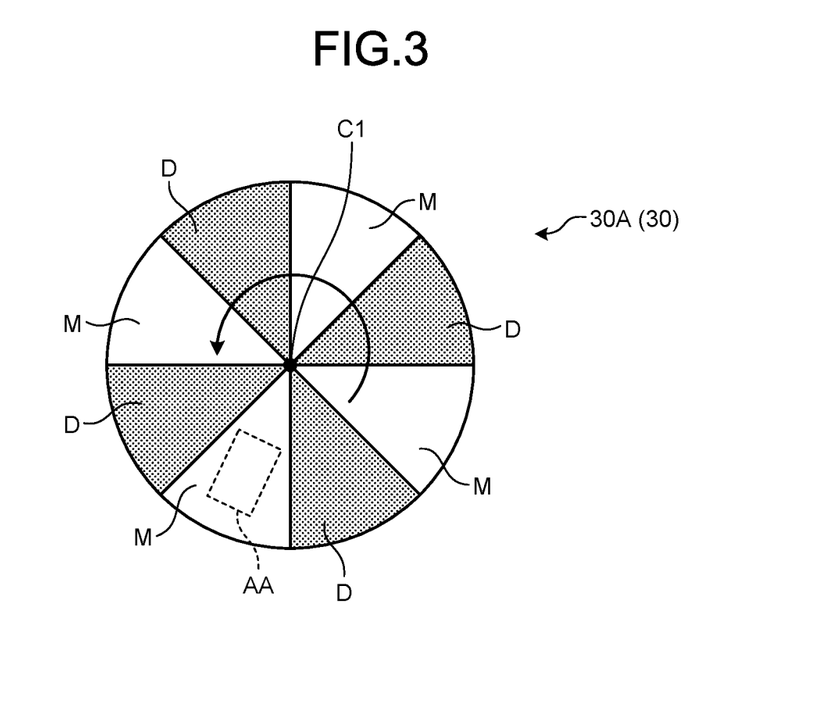
FIG. 3 is a schematic view illustrating an example of a rotating mirror.

FIG. 3 is a schematic view illustrating an example of the rotating mirror 30A. The rotating mirror 30A, which is schematically illustrated in FIG. 3, includes reflection portions M, transmission portions D, and a rotation axis portion C1. Each reflection portion M is a mirror serving as what is called an optical component. Specifically, the reflection portion M is formed by depositing, applying, or attaching aluminum, silver, or a material having light reflectivity equivalent to those of aluminum and silver onto one surface of colorless transparent glass or synthetic resin, for example. The reflection portion M may be a film (reflection multilayered film) that can reflect light, such as an enhanced specular reflector (ESR). The rotation axis portion C1 rotatably supports the reflection portions M and the transmission portions D. Hereinafter, the rotation axis of the rotation axis portion C1 is referred to as a rotation axis C1 in some cases.

An output region AA of light emitted from the light source 20 and travelling through the display panel 10 toward the rotating mirror 30A is sufficiently included in one reflection portion M. In other words, the size and the shape of the reflection surface of each reflection portion M are set so as to be able to include the output region AA. Each transmission portion D transmits light and is made of, for example, colorless transparent glass or synthetic resin. The transmission portion D is, however, not limited thereto and may be an empty portion provided adjacent to the reflection portions M (refer to FIG. 4). The transmission state may be a transmission state in which light passes through a member having light transmitting properties, such as colorless transparent glass and synthetic resin, or a transmission state in which light passes through a space with no optical member such as the first optical component 30. Although not illustrated in the drawing, the size and the shape of a transmission region of each transmission portion D are also set so as to be able to include the output region AA similarly to the reflection portion M. The rotation axis C1 is provided at the center axis of the circumference of the reflection portions M and the transmission portions D that are alternately arranged in the circumferential direction. As the rotating mirror 30A rotates about the rotation axis C1, the reflection portions M and the transmission portions D change positions alternately with respect to a rotation angle of a position corresponding to the output region AA. Thus, by controlling the rotation angle of the rotation axis C1, the rotating mirror 30A can be controlled so that the reflection portion M or the transmission portion D is irradiated with light emitted from the light source 20 and traveling through the display panel 10 toward the front window FW.

FIG. 3 illustrates, as an example, the rotating mirror 30A in which four fan-shaped reflection portions M and four fan-shaped transmission portions D each having an arc-shaped circumference are provided around the rotation axis C1 and are alternately arranged along the circumferential direction. The rotating mirror 30A is, however, merely an example of the specific configuration of the rotating mirror, and the shapes and numbers of the reflection portions M and the transmission portions D are not limited thereto and can be appropriately changed.

Figure 4:
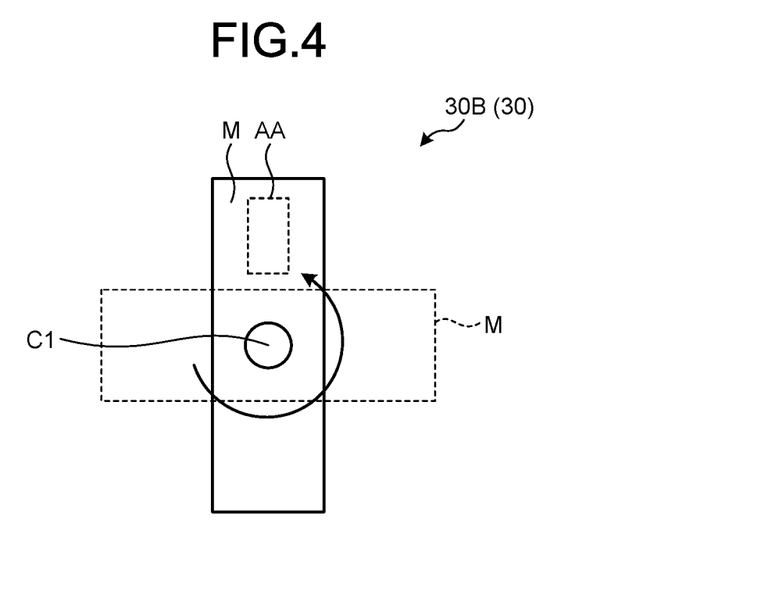
FIG. 4 is a schematic view illustrating another example of the rotating mirror.

FIG. 4 is a schematic view illustrating an example of the rotating mirror 30B. The rotating mirror 30B is the same as the rotating mirror 30A in that the reflection portion M is rotatably provided with the rotation axis C1 serving as a rotation center axis. The rotating mirror 30B is the same as the rotating mirror 30A also in that one reflection portion M located on the outer circumferential side around the rotation axis C1 as a center has a reflection surface that can include the output region AA. On the other hand, the rotating mirror 30B differs from the rotating mirror 30A in that the shape of the reflection portion M is rectangular. The rotation axis C1 is provided, for example, at the intersection of the diagonal lines of the rectangle. The rotation axis C1 may, however, be provided on one end side of the rectangle in a longer side direction.

When the rotation angle of the rotating mirror 30B is controlled such that the reflection portion M is at a position indicated by dashed lines in FIG. 4, there is nothing at the position of the output region AA. In this case, light emitted to the output region AA passes through the rotating mirror 30B and travels toward the front window FW without being blocked by the rotating mirror 30B. Thus, by controlling the rotation angle of the rotation axis C1 to rotate the reflection portion M, the rotating mirror 30B can be controlled so that light emitted from the light source 20 and traveling through the display panel 10 toward the front window FW is reflected or passes therethrough in the same manner as the rotating mirror 30A.

Figure 5:
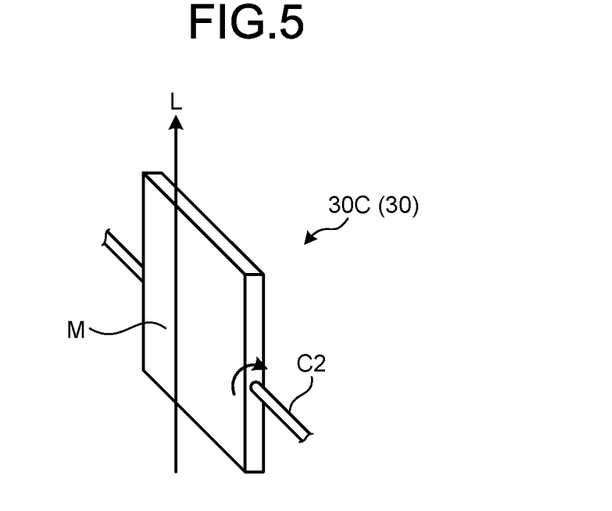
FIG. 5 is a schematic view illustrating an example of a pivoting mirror.

FIG. 5 is a schematic view illustrating an example of a pivoting mirror 30C. The rotating mirrors 30A and 30B that rotate the reflection portion(s) M have been explained as the examples of the specific configuration of the first optical component 30 with reference to FIGS. 3 and 4. Motion of the mirror serving as what is called the optical member is, however, not limited to rotation. For example, the pivoting mirror 30C may be employed as the first optical component 30. The pivoting mirror 30C enables switching between reflection and transmission of light traveling through the display panel 10 toward the front window FW, by causing the reflection portion M to pivot about a pivot axis C2 as a center with respect to the traveling direction L of light as illustrated in FIG. 5. It is needless to say that reflection and transmission of light can be switched also by causing the pivoting mirror 30C to pivot about the pivot axis C2.

The specific configuration of the first optical component 30 is not limited to the configuration that physically changes the position of the mirror serving as what is called the optical member. The first optical component 30 may be a liquid crystal mirror. An example of the specific configuration of the liquid crystal mirror (liquid crystal mirror 30D) will be explained below with reference to FIGS. 6 and 7.

Figure 6:
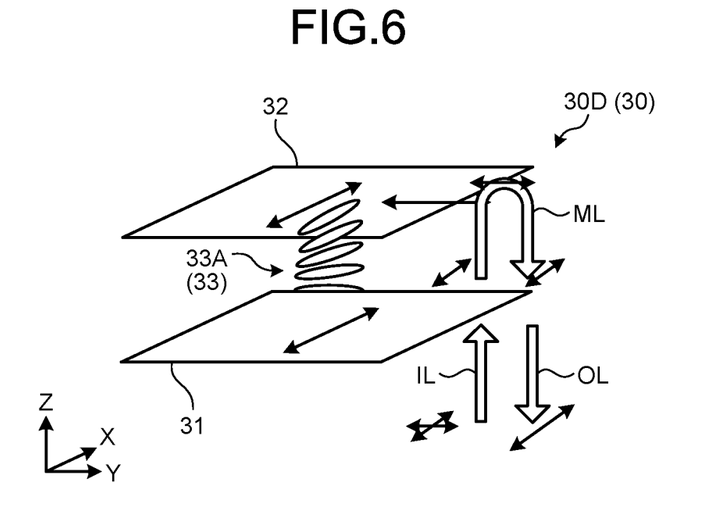
FIG. 6 is a schematic view illustrating an example of a main configuration of a liquid crystal mirror.
Figure 7:
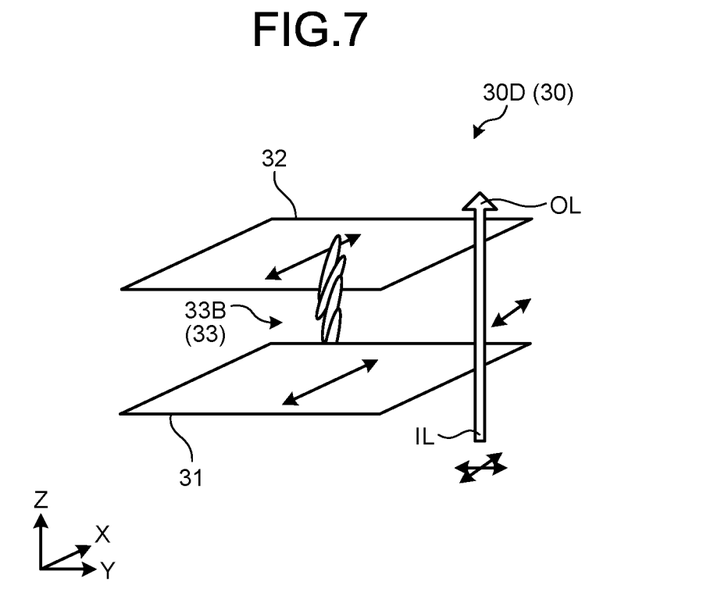
FIG. 7 is a schematic view illustrating another example of the main configuration of the liquid crystal mirror.

FIGS. 6 and 7 are schematic views illustrating examples of a main configuration of the liquid crystal mirror 30D. The liquid crystal mirror 30D includes a first substrate 31, a second substrate 32, and a liquid crystal layer 33. Two directions along the plate surfaces of the first substrate 31 and the second substrate 32 are an X direction and a Y direction, and a direction orthogonal to the X direction and the Y direction is a Z direction.

The first substrate 31 is a substrate superimposed with a light-transmitting substrate or a polarizing plate having polarizing properties of transmitting a component vibrating in the X direction among the components of light traveling along the Z direction with a plurality of vibration directions including the X direction and the Y direction. The first substrate 31 does not transmit components of light that vibrate in directions (for example, the Y direction) other than the X direction. As with the first substrate 31, the second substrate 32 has polarizing properties of transmitting the component vibrating in the X direction of the components among light traveling along the Z direction with the vibration directions including the X direction and the Y direction. The second substrate 32, on the other hand, reflects a component of light that vibrates in the Y direction unlike the first substrate 31. The second substrate 32 is a substrate provided with a reflective polarizing film such as a dual brightness enhancement film (DBEF). The liquid crystal layer 33 is sealed between the first substrate 31 and the second substrate 32. Electrodes (not illustrated) are provided on at least one of the first substrate 31 and the second substrate 32 such that a voltage to be applied to the liquid crystal layer 33 can be controlled through the electrodes. The liquid crystal layer 33 changes influences on the vibration direction of light passing through between the first substrate 31 and the second substrate 32 in accordance with the applied voltage.

A liquid crystal layer 33A illustrated in FIG. 6 is the liquid crystal layer 33 in a state of giving influences to change the vibration direction of polarized light ML in incident light IL, which has passed through the first substrate 31 and vibrates in the X direction, from the X direction to the Y direction by the time at which the polarized light ML reaches the second substrate 32. The liquid crystal layer 33A causes the polarized light ML to be reflected by the second substrate 32 and travel toward the first substrate 31. While the polarized light ML travels from the second substrate 32 to the first substrate 31, the vibration direction of the polarized light ML is changed from the Y direction to the X direction with the influences given by the liquid crystal layer 33. After reaching the first substrate 31, the polarized light ML passes through the first substrate 31 to be output as output light OL. That is to say, in the example illustrated in FIG. 6, the incident light IL is reflected by the liquid crystal mirror 30D and is output as the output light OL.

A liquid crystal layer 33B illustrated in FIG. 7 is the liquid crystal layer 33 in a state of not changing the vibration direction of the polarized light ML in the incident light IL that has passed through the first substrate 31 and vibrates in the X direction. The liquid crystal layer 33B causes the incident light IL to pass through the second substrate 32 and to become the output light OL. That is to say, in the example illustrated in FIG. 7, the incident light IL passes through the liquid crystal mirror 30D and is output as the output light OL. As explained with reference to FIGS. 6 and 7, the liquid crystal mirror 30D can be switched between a transmission state and a reflection state without changing the physical positions and the angles of the first substrate 31 and the second substrate 32.

The controller 50 includes a circuit in which various functions related to switching between the reflection state and the transmission state of the switchable optical component are implemented. Specifically, the controller 50 includes a configuration that corresponds to the specific configuration of the switchable optical component such as the first optical component 30. For example, in the case of the first optical component 30 that is provided to be switched between the reflection state and the transmission state by operation control of the angle like the rotating mirrors 30A and 30B and the pivoting mirror 30C, the controller 50 is provided as a configuration including a motor driver configured to control operations of an electric motor coupled to the rotation axis portion (the rotation axis C1 or the pivot axis C2). The controller 50 operates the electric motor in accordance with switching timing of predetermined light projection positions (the first position P1, the second position P2, and the like). The controller 50 links switching of the images to be projected to the first position P1 and the second position P2 with switching of the states of the first optical component 30. In the case of the first optical component 30 that is provided to be switched between the reflection state and the transmission state by control of the liquid crystal layer 33 like the liquid crystal mirror 30D, the controller 50 has a function as what is called a display driver integrated circuit (DDIC) and controls voltage to be applied to electrodes provided to the liquid crystal mirror 30D to control the state of the liquid crystal layer 33, thereby switching between the reflection state and the transmission state in accordance with the switching timing of the predetermined light projection positions (the first position P1, the second position P2, and the like).

The number of the light projection positions is not limited to two (for example, the first position P1 and the second position P2). Three or more projection positions may be set. The following describes an example when three light projection positions (for example, the first position P1, the second position P2, and a third position P3) are set, with reference to FIGS. 8 and 9A.

Figure 8:
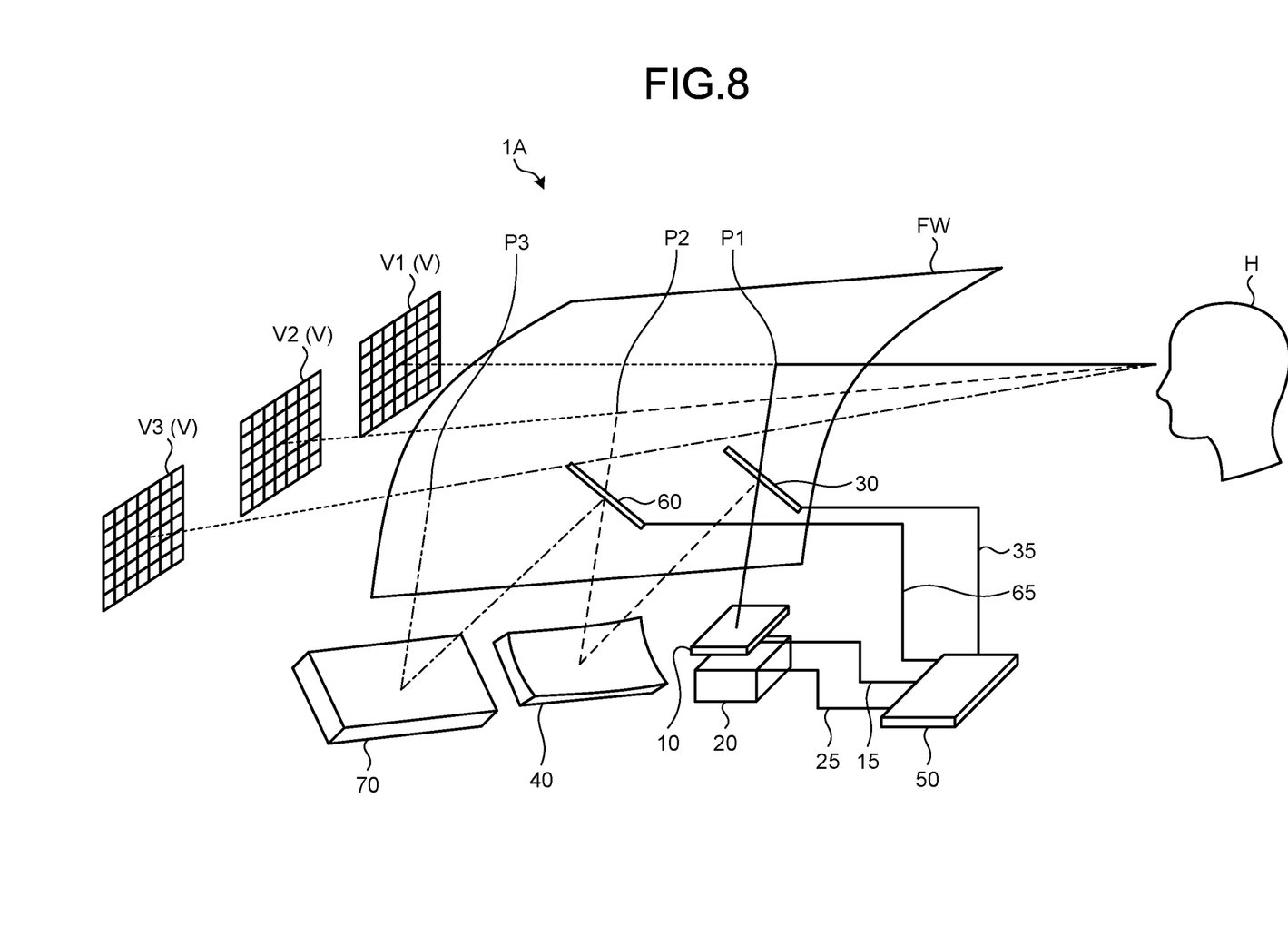
FIG. 8 is a schematic diagram illustrating a main configuration and a principle of another display device.

FIG. 8 is a schematic diagram illustrating a main configuration and a principle of a display device 1A. The display device 1A projects an image onto a projection portion such as the front window FW in the same manner as the display device 1. In addition to the same configuration as that of the display device 1, the display device 1A further includes a third optical component 60 and a fourth optical component 70. The third optical component 60 and the controller 50 are coupled via wiring 65.

The third optical component 60 is a switchable optical component similar to the first optical component 30. A reflection surface of the third optical component 60 that faces the reflection surface of the second optical component 40 is arranged on a path of light reflected by the second optical component 40. The fourth optical component 70 is a reflection mirror. The fourth optical component 70 can be formed by a reflection mirror with a curved surface that matches with the shape of a projection surface such as the front window FW. When the second optical component 40 can correct the curvatures at both the second position P2 and the third position P3, which will be described later, a plane mirror can be used for the fourth optical component 70. A reflection surface of the fourth optical component 70 is on a path of light reflected by the third optical component 60. In the display device 1A, when the first optical component 30 is in the transmission state, light emitted from the display panel 10 is projected to the first position P1 of the projection portion of light. When the first optical component 30 is in the reflection state and the third optical component 60 is in the transmission state, light emitted from the display panel 10 is reflected by the second optical component 40 and projected to the second position P2 of the projection portion, which is different from the first position P1. When the first optical component 30 and the third optical component 60 are in the reflection state, light reflected by the second optical component 40 and the fourth optical component 70 is projected to the third position P3 of the projection portion, which is different from the first position P1 and the second position P2.

Figure 9B:
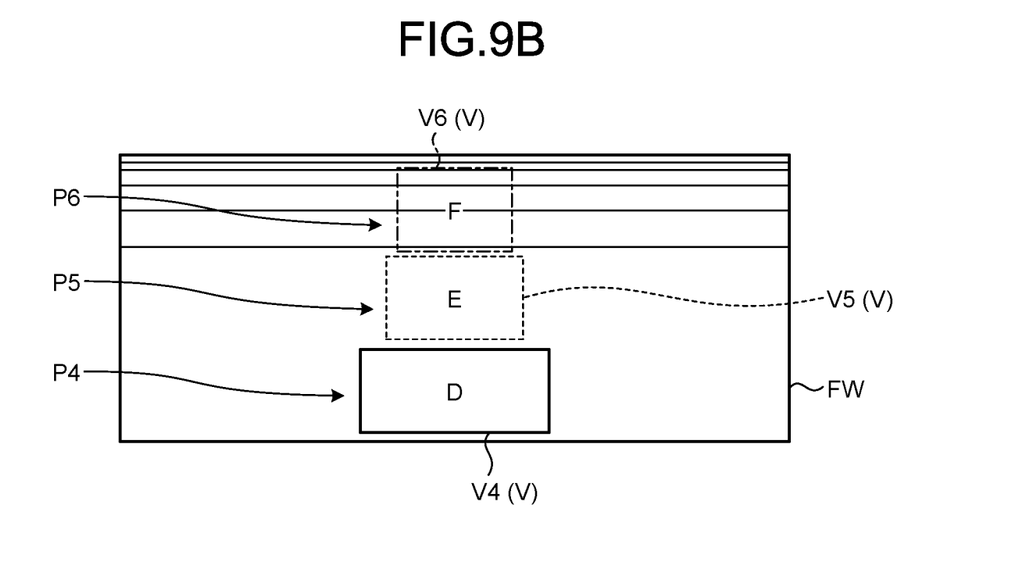
FIG. 9B is a schematic view illustrating difference between an image projected to a first position, an image projected to a second position, and an image projected to a third position.

FIG. 9A is a schematic view illustrating difference between an image A projected to the first position P1, an image B projected to the second position P2, and an image C projected to the third position P3. FIG. 9B is a schematic view illustrating difference between an image D projected to a first position P4, an image E projected to a second position P5, and an image F projected to a third position P6. As illustrated in FIG. 9A, the display device 1A can change the virtual image V (a virtual image V1, a virtual image V2, or a virtual image V3) depending on the light-projected position (the first position P1, the second position P2, or the third position P3). The display device 1 can also change the virtual image V (the virtual image V1 or the virtual image V2) depending on the light-projected position (the first position P1 or the second position P2). In the case of the display device 1, the third optical component 60, the fourth optical component 70, the third position P3, and the virtual image V3 in FIG. 9A are omitted. As illustrated in FIG. 9B, the display device 1A can change the virtual image V (a virtual image V4, a virtual image V5, or a virtual image V6) depending on the light-projected position (the first position P4, the second position P5, or the third position P6). FIG. 9B illustrates an area controlled to display the images (the virtual images V4, V5, and V6) aligned vertically and to make them be viewed in such a manner that the deeper an image is, the higher its position is. As illustrated in FIGS. 9A and 9B, the positions and the sizes of the virtual images V to be viewed can be appropriately changed. As an example of a combination of the virtual images V4, V5, and V6, it can be considered that the image V4 is an image of a speedometer of a car, the image V5 is an image of a (engine) tachometer of the car, and the image V6 is an image of a fuel gauge of the car. The combination is, however, not limited thereto and can be appropriately changed.

The display panel 10 switches an output image in synchronization with the switching timing between the reflection state and the transmission state of the switchable optical component. In the embodiment, the controller 50 controls display output images of the display panel 10. The controller 50 functions as the DDIC configured to control the display output contents of the display panel 10. The controller 50 synchronizes control timing of the display panel 10 with control timing of the first optical component 30. When displaying the image A, for example, the controller 50 sets the first optical component 30 to be in the transmission state, the details of which will be described later. When displaying the image B, which will be described later, the controller 50 sets the first optical component 30 to be in the reflection state and sets the third optical component 60 to be in the transmission state. When displaying the image C, the controller 50 sets both the first optical component 30 and the third optical component 60 to be in the reflection state. A circuit controlling the display panel 10 and a circuit controlling the first optical component 30 may be provided separately, and the separated circuits may be synchronized with each other. An independent circuit for such synchronization may be further provided. Synchronization control of the light-projected positions and the virtual images V will be explained below with reference to FIGS. 10 and 11.

Figure 10:
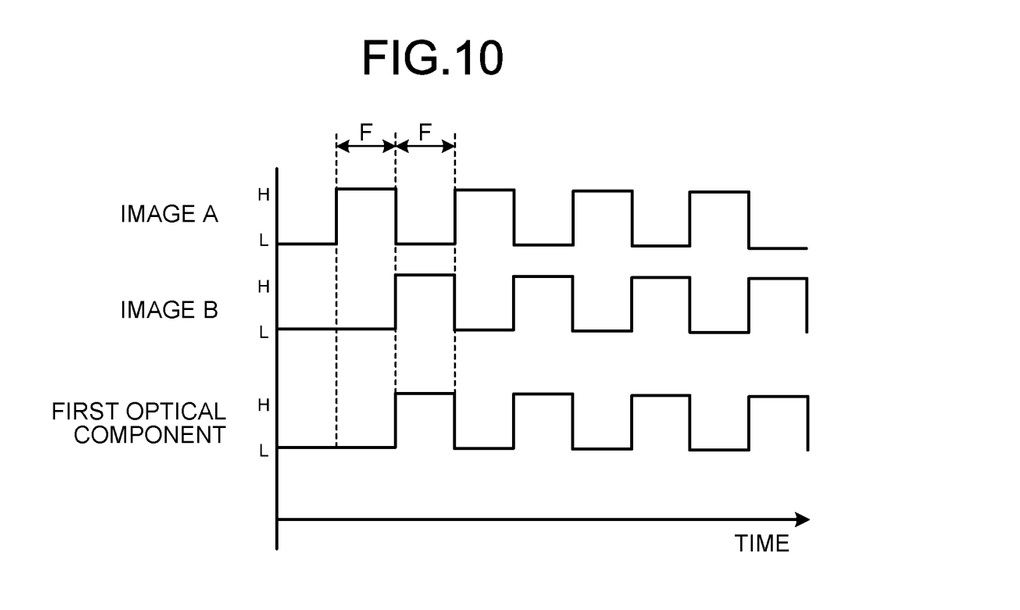
FIG. 10 is a timing chart illustrating an example of synchronization control of display output images and a switchable optical component.
Figure 11:
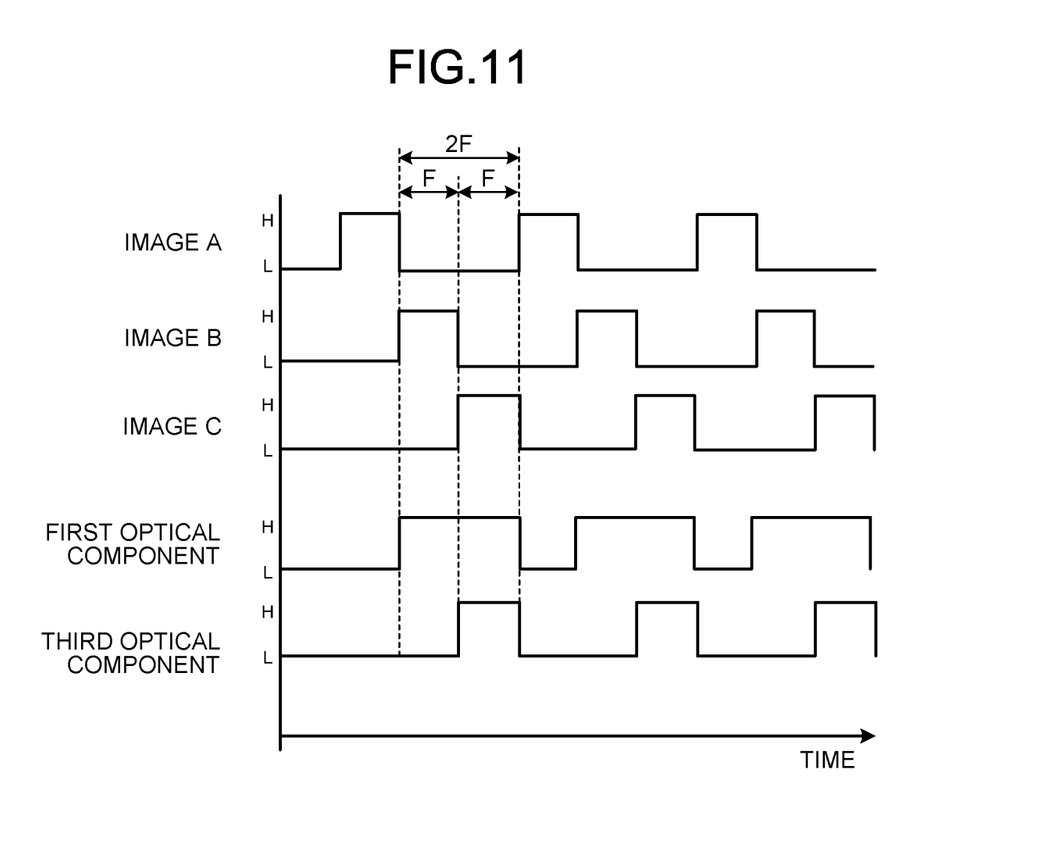
FIG. 11 is a timing chart illustrating an example of synchronization control of display output images and switchable optical components.

FIG. 10 and FIG. 11 are timing charts illustrating examples of the synchronization control of the display output images and the switchable optical component(s). FIG. 10 illustrates the case of the display device 1, and FIG. 11 illustrates the case of the display device 1A. High (H)/low (L) pulses for the images A and B illustrated in FIG. 10 indicate that each image is displayed when the pulse is at the high (H) level and the image is not displayed when the pulse is at the low (L) level. The same applies to high (H)/low (L) pulses for the images A, B and C illustrated in FIG. 11. High (H)/low (L) pulses for the "first optical component" (first optical component 30) illustrated in FIG. 10 indicate that the first optical component is in the reflection state when the pulse is at the high level and the first optical component is in the transmission state when the pulse is at the low level. The same applies to high (H)/low (L) pulses for the "first optical component" (first optical component 30) and the "second optical component" (third optical component 60) illustrated in FIG. 11.

As illustrated in FIG. 10, in the display device 1, the image A and the image B are alternately output on the display panel 10 on a frame period F basis. In the display device 1, the reflection state and the transmission state of the first optical component 30 are switched on a frame period F basis in synchronization with the switching timing between the image A and the image B. With this operation, the first optical component 30 becomes in the transmission state and the image A is projected to the first position P1 during the period where the display panel 10 outputs the image A. The first optical component 30 becomes in the reflection state and the image B is projected to the second position P2 during the period where the display panel 10 outputs the image B.

As illustrated in FIG. 11, in the display device 1A, the image A, the image B, and the image C are output in this order on the display panel 10 periodically on a frame period F basis. In the display device 1A, the first optical component 30 and the third optical component 60 are in the transmission state during the output period of the image A. The first optical component 30 is switched to be in the reflection state from the transmission state in synchronization with the switching timing from the image A to the image B. In synchronization with the switching timing from the image B to the image C, the third optical component 60 is switched to be in the reflection state from the transmission state, and the reflection state of the first optical component 30 is kept. The first optical component 30 is therefore in the reflection state for two consecutive frame periods (2F). The first optical component 30 and the third optical component 60 are switched to be in the transmission state from the reflection state in synchronization with the switching timing from the image C to the image A. With this operation, during the period where the display panel 10 outputs the image A, the first optical component 30 becomes in the transmission state and the image A is projected to the first position P1. During the period where the display panel 10 outputs the image B, the first optical component 30 becomes in the reflection state, the third optical component 60 becomes in the transmission state, and the image B is projected to the second position P2. During the period where the display panel 10 outputs the image C, the first optical component 30 and the third optical component 60 become in the reflection state and the image C is projected to the third position P3.

In the explanation with reference to FIGS. 10 and 11, the unit period for switching of the images and switching of the states of the optical component(s) match with the update period (one frame period F) of a frame image to be displayed on the display panel 10. This is, however, an example of the unit period and is not limiting. The unit period may be equal to or more than two frame periods. Although one frame period F is, for example, one sixtieth of a second, one frame period F is not limited thereto and can be set to a desired period of time corresponding to a frame rate applicable to the display panel 10, such as one hundred twentieth of a second. The display order of the images A, B, and C is not limited to the above-mentioned order and can be appropriately changed. The images D, E, and F explained with reference to FIG. 9B can be similarly handled by replacing the images A, B, and C explained with reference to FIGS. 10 and 11 by the images D, E, and F.

The display panel 10 is, for example, the transmissive liquid crystal display panel as described above. An example of the specific configuration of the display panel 10 will be explained with reference to FIG. 12.

FIG. 12 is a view illustrating an example of the specific configuration of the display panel 10. The display panel 10 includes an array substrate 12, a counter substrate 13, and a liquid crystal layer 106 as a display function layer. The counter substrate 13 is arranged so as to face a surface of the array substrate 12 in the perpendicular direction. The liquid crystal layer 106 is provided between the array substrate 12 and the counter substrate 13.

The array substrate 12 includes a first substrate 121, pixel electrodes 122, a common electrode 123, an insulating layer 124, a polarizing plate 125, and an orientation film 128. Switching elements Tr such as thin film transistors (TFTs) and various types of wiring lines such as gate lines GCL and signal lines SGL (not illustrated in FIG. 12) are provided to the first substrate 121.

The common electrode 123 is provided on the upper side of the first substrate 121. The pixel electrodes 122 are provided on the upper side of the common electrode 123 with the insulating layer 124 interposed therebetween. The pixel electrodes 122 are provided in a different layer from the common electrode 123 and are arranged so as to overlap the common electrode 123 in plan view. The pixel electrodes 122 are arranged in a matrix with a row-column configuration in plan view. The orientation film 128 is provided on the upper side of the pixel electrodes 122. The polarizing plate 125 is provided on the lower side of the first substrate 121. The pixel electrodes 122 and the common electrode 123 are made of a conductive material having a light-transmitting property, such as indium tin oxide (ITO). In the present embodiment, the pixel electrodes 122 are provided on the upper side of the common electrode 123. The common electrode 123 may be provided on the upper side of the pixel electrodes 122.

In explanation of the display panel 10, a direction toward a second substrate 131 from the first substrate 121 in the direction perpendicular to the surface of the first substrate 121 is the "upper side". A direction from the second substrate 131 toward the first substrate 121 is the "lower side". The term "plan view" denotes view from a direction perpendicular to the surface of the first substrate 121. The light source 20 is provided on the lower side of the array substrate 12.

The counter substrate 13 includes the second substrate 131, a color filter 132, an orientation film 138, and a polarizing plate 135. The color filter 132 is formed on one surface of the second substrate 131. The orientation film 138 is provided on the lower side of the color filter 132. The polarizing plate 135 is provided on the other surface of the second substrate 131.

The first substrate 121 and the second substrate 131 are arranged so as to face each other with a predetermined interval therebetween by a seal portion 133. The liquid crystal layer 106 is provided in a space enclosed by the first substrate 121, the second substrate 131, and the seal portion 133. The liquid crystal layer 106 modulates light that passes therethrough in accordance with an electric field state, and liquid crystals in a transverse electric field mode such as in-plane switching (IPS) including fringe field switching (FFS) is used therefor. In the present embodiment, the liquid crystal layer 106 is driven by a transverse electric field generated between the pixel electrodes 122 and the common electrodes 123.

Although the display panel 10 illustrated in FIG. 12 is the transverse electric field-type liquid crystal display, the display panel 10 is not limited to this type and may also be a vertical electric field-type liquid crystal display device. In this case, the common electrode 123 is provided to the counter substrate 13. In the vertical electric field-type liquid crystal display device, the liquid crystal layer 106 is driven by what is called a vertical electric field generated between the pixel electrodes 122 and the common electrode 123. Examples of the vertical electric field-type liquid crystal layer 106 include twisted nematic (TN), vertical alignment (VA), and electrically controlled birefringence (ECB) liquid crystals.

The display panel 10 is not limited to the liquid crystal display panel. A self-luminous display panel such as an organic light-emitting diode (OLED) panel may be provided instead of the configuration of the display panel 10 and the light source 20. An example of the specific configuration of the OLED panel (display panel 10A) will be explained below with reference to FIG. 13.

Figure 13:
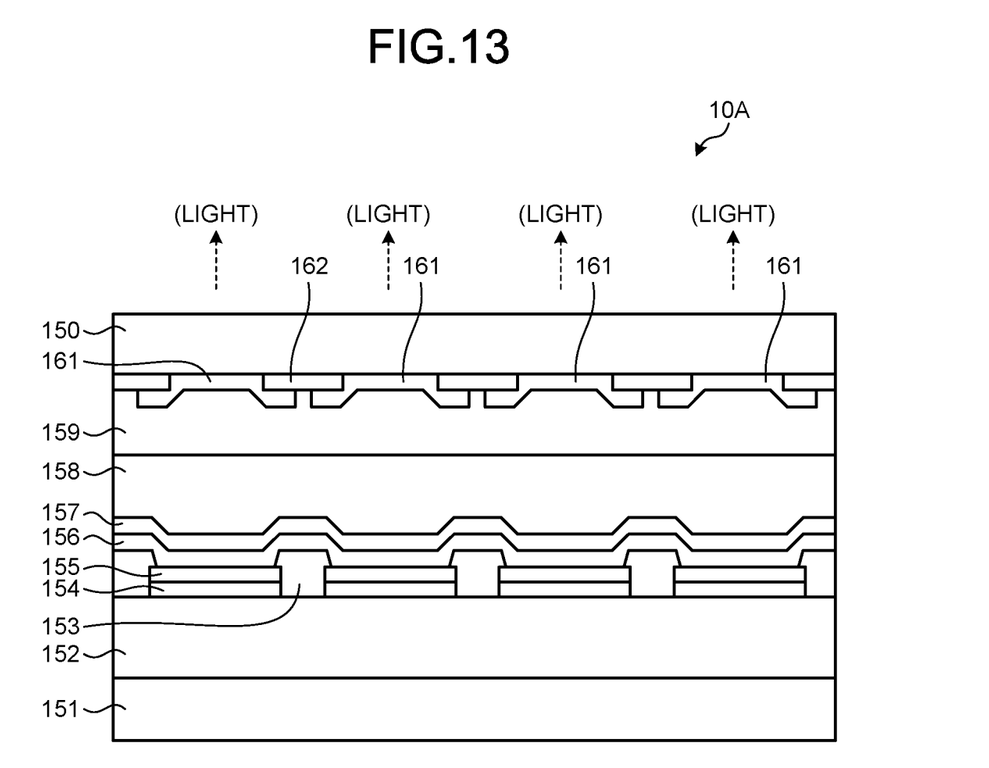
FIG. 13 is a view illustrating another example of the specific configuration of a display panel.

FIG. 13 is a view illustrating an example of the specific configuration of the display panel 10A. As illustrated in FIG. 13, the display panel 10A includes a substrate 151, insulating layers 152 and 153, reflection layers 154, lower electrodes 155, a self-luminous layer 156, an upper electrode 157, insulating layers 158 and 159, color filters 161 as color conversion layers, a black matrix 162 as a light shielding layer, and a substrate 150. The substrate 151 is a semiconductor substrate such as silicon, a glass substrate, a resin substrate, or the like. The insulating layer 152 can be made of silicon oxide, silicon nitride, or the like. The lower electrodes 155 are conductors that serve as the anodes of OLEDs. The lower electrodes 155 are light-transmitting electrodes made of a light-transmitting conductive material (light-transmitting conductive oxide) such as indium tin oxide (ITO). The insulating layers 153 are called banks and are insulating layers that separate pixels from one another. The reflection layers 154 are made of a glossy metallic material that reflects light from the self-luminous layer 156, such as silver, aluminum, and gold. The self-luminous layer 156 contains an organic material and includes a hole injection layer, a hole transport layer, a light-emitting layer, an electron transport layer, and an electron injection layer (not illustrated).

The upper electrode 157 is a light-transmitting electrode made of a light-transmitting conductive material (light-transmitting conductive oxide) such as indium tin oxide (ITO). Although in the present embodiment, ITO is mentioned as an example of the light-transmitting conductive material, the light-transmitting conductive material is not limited thereto. A conductive material with a different composition, such as indium zinc oxide (IZO), may be used as the light-transmitting conductive material. The upper electrode 157 serves the cathode of the OLEDs. The insulating layer 158 is a sealing layer that seals the above-mentioned upper electrode 157 and can be made of silicon oxide, silicon nitride, or the like. The insulating layer 159 is a flattening layer that eliminates steps caused by the banks and can be made of silicon oxide, silicon nitride, or the like. The substrate 150 is a light-transmitting substrate that protects the entire display panel 10A, and, for example, a glass substrate can be used therefor. Although FIG. 13 illustrates the example in which the lower electrodes 155 are the anodes and the upper electrode 157 is the cathode, the configuration is not limited thereto. The lower electrodes 155 may be the cathodes and the upper electrode 157 may be the anode. In this case, the polarities of drive transistors Tr2 that are electrically coupled to the lower electrodes 155 can also be appropriately changed, and the stacking order of the carrier injection layer (the hole injection layer and the electron injection layer), the carrier transport layer (the hole transport layer and the electron transport layer), and the light-emitting layer can also be appropriately changed.

FIG. 13 exemplifies the configuration in which the color of each pixel is set using the color filter 161. Alternatively, color display can also be made by varying the color of light emitted by the OLED provided for each pixel. In addition, the color display function is not essential. In the case of monochromatic display, configurations such as the color filters 132 and 161 can be omitted.

As explained above, according to the embodiment, each of the display device 1 and display device 1A includes the display panel (the display panel 10 or the display panel 10A), the first optical component 30 serving as the switchable optical component capable of being switched between the reflection state and the transmission state of light by the reflection surface thereof, and the second optical component 40. The reflection surface of the first optical component 30 that faces the display panel is arranged on the light path extending from the display panel, and the reflection surface of the second optical component 40 is on the path of light reflected by the first optical component 30. This configuration allows the display device 1 to project two images onto the projection portion such as the front window FW by switching between the reflection state and the transmission state of the first optical component 30.

When the first optical component 30 is in the transmission state, light output from the display panel (the display panel 10 or the display panel 10A) is projected to the first position P1 of the projection portion (front window FW) of light. When the first optical component 30 is in the reflection state, light output from the display panel is projected to the second position P2 of the projection portion, which is different from the first position P1. This configuration allows the display device 1 to project the image corresponding to the virtual image V1 that is projected to the first position P1 of the projection portion and that is viewable by the user H and the image corresponding to the virtual image V2 that is projected to the second position P2 and that is viewable by the user H, by switching the first optical component 30 between the reflection state and the transmission state.

The display device 1A includes the third optical component 60 serving as the switchable optical component and the fourth optical component 70. The reflection surface of the third optical component 60 that faces the reflection surface of the second optical component 40 is arranged on the path of light reflected by the second optical component 40, and the reflection surface of the fourth optical component 70 is on the path of light reflected by the third optical component 60. This configuration allows the display device 1A to project three images onto the projection portion such as the front window FW by switching the first optical component 30 and the third optical component 60 between the reflection state and the transmission state.

When the first optical component 30 is in the transmission state, light output from the display panel (the display panel 10 or the display panel 10A) is projected to the first position P1 of the projection portion (front window FW) of light. When the first optical component 30 is in the reflection state and the third optical component 60 is in the transmission state, light output from the display panel is reflected by the second optical component 40 and projected to the second position P2 of the projection portion, which is different from the first position P1. When the first optical component 30 and the third optical component 60 are in the reflection state, light reflected by the second optical component 40 and the fourth optical component 70 is projected to the third position P3 of the projection portion, which is different from the first position P1 and the second position P2. With this configuration, it is possible for the display device 1A, by switching between the reflection state and transmission state of the first optical component 30 and the third optical component 60, to project the image corresponding to the virtual image V1 that is projected to the first position P1 of the projection portion and viewable by the user H, the image corresponding to the virtual image V2 that is projected to the second position P2 and viewable by the user H, and the image corresponding to the virtual image V3 that is projected to the third position P3 and viewable by the user H.

The second optical component 40 may also be a concave mirror. This facilitates limitation on a projection area of light to be projected onto the front window FW to easily concentrate light and increase the brightness of the virtual image V. By matching the curvature of the concave surface with the curvature of the projection portion having a curve, such as the front window FW, it is possible to restrain distortion in the virtual image V from being visible. The fourth optical component 70 may also be a plane mirror. This can simplify the configuration of the fourth optical component 70. Even when the projection portion with a curve, like the front window FW, is used, the second optical component 40 can restrain the distortion caused by the curve from being visible.

Each of the display device 1 and the display device 1A includes the controller 50 configured to switch between the reflection state(s) and the transmission state(s) of the switchable optical component(s). The reflection state(s) and the transmission state(s) of the switchable optical component(s) can thereby be controlled.

The display panel (the display panel 10 or the display panel 10A) changes the output image in synchronization with the switching timing between the reflection state(s) and the transmission state(s) of the switchable optical component(s). The switching enables different images to be projected to the respective projection positions. The switching timing is set on a frame basis. This eliminates setting of special timing for synchronization control for projecting different images to the respective projection positions, whereby easier synchronization control can be performed.

When the switchable optical component is the rotating mirror or the pivoting mirror, switching between the reflection state and the transmission state of the switchable optical component can be performed with physical operations. When the switchable optical component is the liquid crystal mirror, switching between the reflection state and the transmission state of the switchable optical component can be performed by controlling the voltage to be applied to the liquid crystal layer 33 included in the liquid crystal mirror.

When the display panel 10 is a liquid crystal panel, the configuration can be obtained at lower cost. When the display panel 10A is an OLED panel, the light source 20 can be omitted, thereby making the configuration more compact.

FIG. 9A exemplifies the case where the first optical component 30 and the third optical component 60 are the pivoting mirrors like the pivoting mirror 30C. The first optical component 30 may, however, have another configuration (for example, the first optical component 30A or 30B or the liquid crystal mirror 30D). A common image may be projected to different projection positions. The projection portion is not limited to the front window FW, and it is sufficient that the projection portion has a configuration to which light of an image can be projected. The display panel is not limited to the display panel 10 or the display panel 10A, and it is sufficient that the display panel has a configuration capable of outputting light of a projection image.

The above describes, as an example of the embodiment, the HUD that projects an image onto the projection portion such as the front window FW and the combiner of the vehicle. The embodiment is, however, not limited thereto. It is also possible to install the display device according to the present disclosure into a portion near a driver's seat or a passenger's seat of an aircraft, a ship, an industrial machine such as a construction machine, or another vehicle. The display device according to the present disclosure can also be installed indoors such as tourist information on an observation deck or in an aquarium without being limited to the vehicle.

Other action effects provided by the modes described in the present embodiment that are obvious from description of the present specification or at which those skilled in the art can appropriately arrive should be interpreted to be provided by the present disclosure.

What is claimed is:
1. A display device comprising:
  a display panel;
  a first optical component serving as a switchable optical component capable of being switched between a reflection state and a transmission state of light by a reflection surface thereof; and
  a second optical component, wherein
  the reflection surface of the first optical component that faces the display panel is arranged on a light path extending from the display panel,
  the second optical component has a reflection surface,
  the reflection surface of the second optical component is on a path of light reflected by the first optical component, and
  the first optical component includes a mirror having the reflection surface and switches between
    the reflection state in which the reflection surface of the mirror is on the light path, and
    the transmission state in which the reflection surface of the mirror is not on the light path.

2. The display device according to claim 1, wherein
  when the first optical component is in the transmission state, light output from the display panel is projected to a first position of a projection portion of the light, and
  when the first optical component is in the reflection state, the light output from the display panel is projected to a second position of the projection portion, which is different from the first position.

3. The display device according to claim 1, comprising a controller configured to switch between the reflection state and the transmission state of the switchable optical component.

4. The display device according to claim 1, wherein the display panel is configured to change an output image in synchronization with switching timing between the reflection state and the transmission state of the switchable optical component.

5. The display device according to claim 4, wherein the switching timing is set on a frame basis.

6. The display device according to claim 1, wherein the second optical component is a concave mirror.

7. The display device according to claim 1, wherein the switchable optical component is a rotating mirror or a pivoting mirror.

8. The display device according to claim 1, wherein the display panel is a liquid crystal panel.

9. The display device according to claim 1, wherein the display panel is an OLED panel.

10. A display device comprising:
  a display panel;
  a first optical component serving as a switchable optical component capable of being switched between a reflection state and a transmission state of light by a reflection surface thereof;
  a second optical component;
  a third optical component serving as the switchable optical component; and
  a fourth optical component, wherein
  the reflection surface of the first optical component that faces the display panel is arranged on a light path extending from the display panel,
  the second optical component has a reflection surface,
  the reflection surface of the second optical component is on a path of light reflected by the first optical component,
  a reflection surface of the third optical component that faces the reflection surface of the second optical component is arranged on a path of light reflected by the second optical component, the fourth optical component has a reflection surface, and
the reflection surface of the fourth optical component is on a path of light reflected by the third optical component.

11. The display device according to claim 10, wherein
when the first optical component is in the transmission state, light output from the display panel is projected to a first position of a projection portion of the light,
when the first optical component is in the reflection state and the third optical component is in a transmission state, the light output from the display panel is reflected by the second optical component and projected to a second position of the projection portion, which is different from the first position, and
when the first optical component and the third optical component are in reflection state, light reflected by the second optical component and the fourth optical component is projected to a third position of the projection portion, which is different from the first position and the second position.

12. The display device according to claim 10, wherein fourth optical component is a plane mirror.

13. The display device according to claim 10, comprising a controller configured to switch between the reflection state and the transmission state of the switchable optical component.

14. The display device according to claim 10, wherein the display panel is configured to change an output image in synchronization with switching timing between the reflection state and the transmission state of the switchable optical component.

15. The display device according to claim 14, wherein the switching timing is set on a frame basis.

16. The display device according to claim 10, wherein the second optical component is a concave mirror.

17. The display device according to claim 10, wherein the switchable optical component is a rotating mirror or a pivoting mirror.

18. The display device according to claim 10, wherein the switchable optical component is a liquid crystal mirror.

19. The display device according to claim 10, wherein the display panel is a liquid crystal panel.

20. The display device according to claim 10, wherein the display panel is an OLED panel.

* * * * *